United States Patent Office 3,634,451
Patented Jan. 11, 1972

3,634,451
PHTHALOCYANINE-SULPHONIC ACID ARYL ESTERS
Manfred Groll, Cologne, Hans-Samuel Bien, Burscheid, and Karl Neufang, Cologne, Germany, assignors to Farbenfabriken Bayer Aktiengesellschaft, Leverkusen, Germany
No Drawing. Filed Nov. 14, 1968, Ser. No. 775,928
Claims priority, application Germany, Nov. 24, 1967,
P 15 69 762.8
Int. Cl. C09b 47/04
U.S. Cl. 260—314.5                                   1 Claim

ABSTRACT OF THE DISCLOSURE

A phthalocyanine dyestuff which is free of carboxylic acid and sulphonic acid groups and has the formula $$Pc-(SO_2-O-Ar)_w$$

wherein Pc is an optionally substituted phthalocyanine, Ar is phenyl or naphthyl optionally substituted by alkyl, alkoxy, carboxylic ester, or halogen, and w is the numbers 2–4. These dyestuffs are useful in dyeing synthetic materials and in coloring lacquers, varnishes, fuels, and waxes.

---

The object of the present invention comprises phthalocyanine-sulphonic acid aryl esters which are free from carboxylic acid and sulphonic acid groups and correspond to the formula $$PC-(SO_2-O-Ar)_w \quad (I)$$

in which Pc denotes the radical of an optionally substituted phthalocyanine; Ar is a phenyl or naphthyl radical which may be substituted by alkyl radicals, alkoxy radicals, carboxylic ester groups or halogen atoms; and w stands for the numbers 2–4, as well as their production and their use for the dyeing of synthetic materials in the mass.

The term "optionally substituted phthalocyanines" comprises metal-free as well as metal-containing phthalocyanines, especially Cu-, Co- and Ni-phthalocyanines, which may carry substituents such as halogen atoms, especially chlorine and bromine; alkyl groups, especially methyl and ethyl groups; alkoxy groups; aryloxy groups; and, preferably, phenyl radicals which may be further substituted. The sulphonic acid aryl ester grouping may stand in the 3- or 4-position of the benzene nuclei of the phthalocyanine, or they may be linked to the phthalocyanine skeleton via an optionally substituted phenyl radical.

Alkyl substituents which are suitable for the phenyl and naphthyl radicals are, for example, straight-chain or branched alkyl radicals with 1–12 carbon atoms; suitable alkoxy groups are, for example methoxy and ethoxy groups; suitable carboxylic ester groups are methoxy-carbonyl, ethoxy-carbonyl and (2-ethyl-hexoxy)-carbonyl groups; suitable halogen atoms are mainly chlorine and bromine.

The aryl esters (I) are prepared by reacting phthalocyanine-sulphonic acid halides of the formula $$Pc-(SO_2X)_w \quad (II)$$

in which Pc and w have the same meaning as above and X stands for a halogen atom, especially chlorine, with phenols or naphthols of the formula $$Ar-OH \quad (III)$$

in which Ar has the same meaning as above, or with their salts, especially the alkali metal salts, for example, the sodium or potassium salts.

The reaction of (II) with (III) can be carried out in an aqueous, aqueous-organic or organic medium. Suitable organic solvents are, for example, diglycol monomethyl ether, dioxan, isobutyl alcohol, methanol, o-dichlorobenzene, nitrobenzene and dimethyl formamide.

Suitable phthalocyanine-sulphonic acid halides (II) are, inter alia,

Cu-phthalocyanine-(3,3',3",3''')-tetrasulphonic acid chloride,
Cu-phthalocyanine-(3,3',3")-trisulphonic acid chloride,
Cu-phthalocyanine-(3,3')-di-sulphonic acid chloride,
Cu-phthalocyanine-(3,3',4",4''')-tetra-sulphonic acid chloride,
Cu-phthalocyanine-(3,3',3",4''')-tetra-sulphonic acid chloride,
Cu-phthalocyanine-(4,4',4",4''')-tetra-sulphonic acid chloride,
Ni-phthalocyanine-(3,3',3",3''')-tetra-sulphonic acid chloride,
Ni-phthalocyanine-(3,3',3")-tri-sulphonic acid chloride,
tetra-phenyl-Cu-phthalocyanine-(ph)-tetra-sulphonic acid chloride.

Suitable compounds (III) are, for example, phenol, α-naphthol, β-naphthol, p-cresol, m-cresol, o-cresol, 4-hydroxy-1,2-dimethylbenzene, 3-hydroxy-1,2-dimethyl-benzene, 5-hydroxy-1,4-dimethyl-benzene, triethylphenol (isomer mixture), p-chlorophenol, m-chlorophenol, 2,4-dichlorophenol, pentachlorophenol, hydroquinone monomethyl ether, 4-hydroxy-benzoic acid-(2'-ethyl-hexyl) ester, p-tert.-butyl-phenol, 4-isooctyl-phenol and dodecyl-phenol (isomer mixture), or their sodium or potassium salts.

The dyestuffs of the Formula I according to the invention are readily soluble in organic solvents such as chloroform, toluene, ethyl acetate, o-dichlorobenzene, nitrobenzene, dimethyl formamide, as well as in synthetic materials such as polyesters, for example, condensation products of terephthalic acid and glycol; polyamides, such as condensation products of adipic acid and hexamethylenediamine; polyacrylonitrile; polyvinyl chloride; and polyolefines; they also have a high thermal stability and are therefore particularly suitable for dyeing synthetic materials in the mass and for the colouring of lacquers and varnishes, fuels and waxes.

EXAMPLE 1

3.3 parts sodium hydroxide and 18.5 parts 4-hydroxy-(1,1,3,3-tetramethyl-butyl)-benzene are dissolved with gentle heating in 100 parts diethylene glycol monomethyl ether. After cooling to 20° C., 17.4 parts Cu-phthalocyanine-(3,3',3")-trisulphonic acid chloride (obtained by treating Cu-phthalocyanine with chlorosulphonic acid and thionyl chloride) in the form of a water-moist paste are added with stirring. The reaction mixture is stirred at 20–25° C. for 4 hours, at 35° C. for 2 hours and at 50° C. for 4 hours. The melt is then cooled to 20–25° C. and stirred into 240 parts methanol. After further stirring for on hour, the dyestuff is filtered off with suction, briefly washed with methanol, then with water, and dried. 24.8 parts of the trisulphonic acid ester of the formula

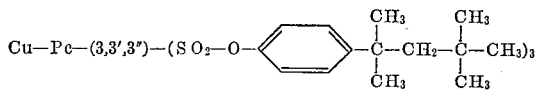

are obtained.

The turquoise-blue dyestuff is readily soluble in chloroform, toluene, ethyl acetate, dimethyl formamide and in materials of aromatic polyesters or polyacrylonitrile.

If the Cu-phthalocyanine - (3,3',3") - trisulphonic acid chloride mentioned above is replaced with 18.8 parts 4,5-dichloro-Cu-phthalocyanine-(3',3",3''') - trisulphonic acid chloride (obtained by treating 4,5-dichloro-Cu-phthalocyanine with chlorosulphonic and thionyl chloride), then a turquoise-blue dyestuff of similar solubility properties is obtained.

EXAMPLE 2

4 parts sodium hydroxide and 31.4 parts dodecyl-phenol (technical product, mixed-branched) are dissolved with gentle heating in 100 parts dioxan. After cooling to 15° C., 19.5 parts Cu-phthalocyanine-(3,3′,3″,3‴)-tetrasulphonic acid chloride (obtained by treating Cu-phthalocyanine with chlorosulphonic acid and thionyl chloride) are introduced in the form of a water-moist paste. The reaction mixture is stirred at 20–25° C. for 2 hours, at 35° for 2 hours, and at 50° C. for 4 hours. The melt is cooled to 20–25° C. and stirred into 240 parts methanol. After further stirring for one hour, the dyestuff is filtered off with suction, briefly washed with methanol, then with water, and dried. 37 parts of the tetrasulphonic acid ester of the formula

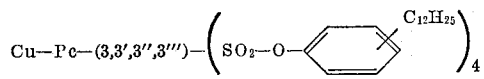

are obtained.

The turquoise-blue dyestuff is readily soluble in chloroform, toluene, ethyl acetate, dimethyl formamide and in materials of aromatic polyesters or polyacrylonitrile.

If the 31.4 parts dodecyl-phenol mentioned in paragraph 1 are replaced with 24.7 parts 4-(1,1,3,3-tetramethylbutyl)-benzene, then there are obtained 29 parts of the tetrasulphonic acid ester of the formula

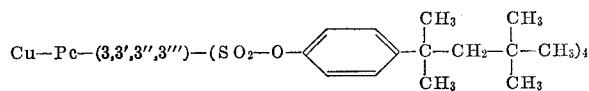

the solubility properties of which are very similar to those of the dodecyl ester obtained according to paragraph 1.

If the 19.5 parts Cu-phthalocyanine-(3,3′,3″,3‴)-tetrasulphonic acid chlorine mentioned in paragraph 1 are replaced with the equimolar amount of Ni-phthalocyanine-(3,3′,3″,3‴)-tetrasulphonic acid chloride (obtained by treating Ni-phthalocyanine with chlorosulphonic acid and thionyl chloride), then 33.2 parts of the dyestuff of the formula

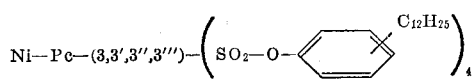

are obtained.

If, in addition, the 31.4 parts dodecyl-phenol mentioned in paragraph 1 are replaced with 24.7 parts 4-(1,1,3,3-tetramethyl-butyl)-benzene, then 28.2 parts of the dyestuff of the formula

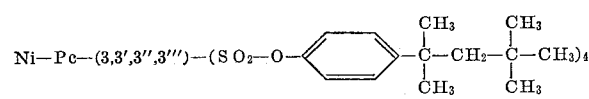

are obtained.

Both dyestuffs are very readily soluble in chloroform, toluene, ethyl acetate, dimethyl formamide and in materials of aromatic polyesters and polyacrylonitrile. Compared with the copper dyestuffs, these nickel dyestuffs have a somewhat more greenish shade.

If the Cu-phthalocyanine-(3,3′,3″,3‴) - tetrasulphonic acid chloride used in paragraph 1 is replaced with equimolar amounts of 4,4′,4″,4‴-tetramethoxy-Cu-phthalocyanine - (6,6′,6″,6‴) - tetrasulphonic acid chloride (obtained by treating 4,4′,4″,4‴-tetramethoxy-Cu-phthalocyanine with chlorosulphonic acid and thionyl chloride at temperatures of up to 82° C.), then there is obtained a green dyestuff which is readily soluble in chloroform, dimethyl formamide and in materials of aromatic polyesters.

EXAMPLE 3

16.5 parts 4-hydroxy-1-tert.-butyl-benzene and 25 parts potassium chloride are dissolved with gentle heating in 100 parts of water. After cooling to 15° C., 19.4 parts Cu-phthalocyanine-(3,3′,3″,3‴)-tetrasulphonic acid chloride (obtained by treating Cu-phthalocyanine with chlorosulphonic acid and thionyl chloride) are introduced in the form of a water-moist paste. The reaction mixture is stirred at 20–25° C. and at 35° for 2 hours each time, then at 50° C. for 4 hours. The melt is filtered off with suction at 20–25° C. and washed with water, methanol and subsequently again with water. After drying, 26 parts of the tetrasulphonic acid ester of the formula

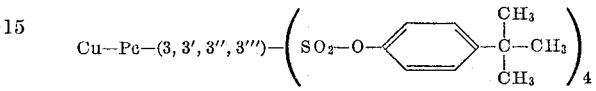

are obtained.

The turquoise-blue dyestuff is readily soluble in chloroform, dimethyl formamide and in materials of synthetic polyesters or polyacrylonitrile.

If the process is carried out in analogy with paragraph 1 but with the use of 4.5 parts potassium hydroxide, 13.2 parts 4-hydroxy-1-tert.-butyl-benzene and 17.4 parts Cu-phthalocyanine-(3,3′,3″)-trisulphonic acid chloride, then there are obtained 23.2 parts of the corresponding trisulphonic acid ester which substantially corresponds, in respect of its solubility properties, to the dyestuff obtained according to paragraph 1.

If the 4-hydroxy-1-tert.-butyl-benzene mentioned in paragraph 1 is replaced with equimolar amounts of 4-hydroxybenzoic acid methyl ester, 2,4-dichlorophenol or pentachlorophenol, then turquoise-blue dyestuffs of similar solubility properties are likewise obtained in good yields.

EXAMPLE 4

19.4 parts Cu - phthalocyanine - (3,3′,3″,3‴) - tetrasulphonic acid chloride (obtained by treating Cu-phthalocyanine with chlorosulphonic acid and thionyl chloride) are introduced in the form of a water-moist paste at 15–20° C. into a solution of 13 parts sodium phenolate in 100 parts diethylene glycol monomethyl ether. The mixture is stirred at 20–25° C. for 2 hours, at 35° C. for 2 hours, at 50° C. for 4 hours, and the melt is then stirred into 240 parts methanol. After further stirring for one hour, the dyestuff is filtered off with suction, washed with methanol and water, and dried. 21 Parts Cu-phthalocyanine-(3,3′,3″,3‴)-tetrasulphonic acid phenyl ester are obtained. The dyestuff obtained is readily soluble in dimethyl formamide, chloroform and in aromatic polyester materials.

If the Na-phenolate used in the above Example is replaced with equimolar amounts of the sodium salts of β-naphthol or hydroquinone monomethyl ether, then the Cu-phthalocyanine - (3,3′,3″,3‴) - tetrasulphonic acid-β-naphthyl ester and the Cu-phthalocyanine-(3,3′,3″,3‴)-tetrasulphonic acid-(4-methoxy - phenyl) ester, respectively, is obtained. Both dyestuffs are readily soluble in dimethyl formamide, chloroform and in aromatic polyester materials.

EXAMPLE 5

4 parts sodium hydroxide and 28 parts 4-hydroxybenzoic acid-(2′-ethylhexyl)-ester are dissolved with gentle heating in 100 parts dioxan. After cooling to 15° C., 19.4 parts Cu-phthalocyanine-(3,3′,3″,3‴)-tetrasulphonic acid chloride (obtained by treating Cu-phthalocyanine with chlorosulphonic acid and thionyl chloride) are introduced in the form of a water-moist paste. The reaction mixture is stirred at 20–25° C. for 2 hours, at 35° C. for 2 hours, and at 50° C. for 4 hours, cooled to 20° C. and the reaction mixture is introduced into 300 parts methanol. After stirring for one hour, the dyestuff is filtered off with suction and washed with methanol and subsequently with water. After drying, 31.5 parts of the dyestuff of the formula

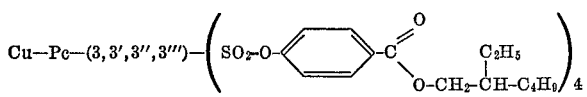

are obtained.

The turquoise-blue dyestuff is very readily soluble in chloroform, toluene, ethyl acetate, dimethyl formamide and in materials of aromatic polyesters, polyacrylonitrile or polyamide.

If the Cu-phthalocyanine-(3,3′,3″,3‴)-tetrasulphonic acid chloride used in paragraph 1 is replaced with Ni-phthalocyanine-(3,3′,3″,3‴)-tetrasulphonic acid chloride (obtained by treating Ni-phthalocyanine with chlorosulphonic acid and thionyl chloride), then the corresponding Ni-phthalocyanine-sulphonic acid ester is obtained. The dyestuff has a greenish turquoise shade. It is very similar to the dyestuff of paragraph 1 in respect of the solubility properties.

EXAMPLE 6

2.2 parts sodium hydroxide and 19.5 parts dodecylphenol (technical product, mixed-branched) are dissolved in 100 parts dioxan. After cooling to 15° C., 12.7 parts tetraphenyl-Cu-phthalocyanine - tetrasulphonic acid chloride (obtained by treating 4,4′,4″,4‴-tetraphenyl-Cu-phthalocyanine with chlorosulphonic acid and thionyl chloride at 20–50° C.) are introduced in the form of a water-moist paste. The reaction mixture is stirred at 20–25° C. for 2 hours, at 35° C. for 2 hours, and at 50° C. for 4 hours. After cooling to 15° C., the dyestuff is filtered off with suction, washed with methanol and subsequently with water, and dried. 14.5 parts of the dyestuff of the formula

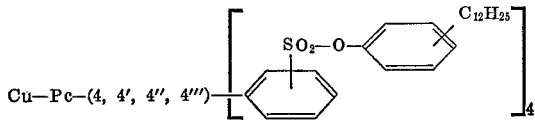

are obtained.

The green dyestuff is readily soluble in dimethyl formamide, chloroform, toluene and in materials of aromatic polyesters or polyacrylonitrile.

EXAMPLE 7

The process is carried out in analogy with Example 1 but with the use of 2.2 parts sodium hydroxide, 13 parts 4-hydroxy-(1,1,3,3-tetramethyl-butyl)-benzene and 15.6 parts Cu-phthalocyanine-(3,3′)-disulphonic acid chloride (obtained by treating Cu-phthalocyanine with chlorosulphonic acid and thionyl chloride until the total degree of sulphonation amounts to 2.0 to 2.1 sulphonic acid chloride groups). 19.7 parts of the dyestuff of the formula

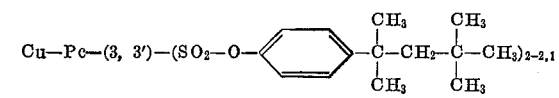

are obtained.

The turquoise-blue dyestuff is readily soluble in dimethyl formamide and chloroform. The solubility in ethyl acetate and toluene is noticeably lower than that of the dyestuff of Example 1.

EXAMPLE 8

5000 parts polyethylene glycol terephthalic acid chips are powdered with 50 parts of the dyestuff described in Example 1, melted in an extruder at 270–280° C. and subsequently extruded and drawn in the usual manner, a blue filament of very good fastness to wet processing and light being obtained.

If the dyestuff described in Example 1 is replaced with the dyestuffs mentioned in Examples 2, 3, 4, 5 (paragraph 1) and 7, then a blue filament of very good fastness to wet processing and light is also obtained. With the use of the dyestuff described in Example 5, paragraph 3, is used, a greenish turquoise filament and with the use of the dyestuff mentioned in Example 6, a green filament of very good fastness to wet processing and light is obtained.

What is claimed is:

1. A phthalocyanine-sulphonic acid aryl ester free from carboxylic acid and sulphonic acid groups having the formula $$Pc—(SO_2—O—Ar)_w$$

wherein Pc is a metal-free phthalocyanine radical or a Co—, Cu or Ni-phthalocyanine radical said radical being unsubstituted, or substituted in its 4- and 5- positions with chlorine or in its 4-position with methoxy; Ar is unsubstituted phenyl, phenyl substituted with one or more same or different radicals methoxy, methoxy carbonyl, ethylhexoxycarbonyl, chlorine or alkyl of 1–12 carbon atoms; or naphthyl; and $w$ is a number from 2 to 4; the sulphonic acid aryl ester grouping of the above formula being bonded directly to the 3- or 4-position of the benzene nuclei of the phthalocyanine radical.

References Cited

UNITED STATES PATENTS

| | | | |
|---|---|---|---|
| 2,706,199 | 1/1953 | Brentano | 260—314.5 |
| 2,479,491 | 7/1947 | Haddock et al. | 260—314.5 |

HENRY R. JILES, Primary Examiner

H. I. MOATZ, Assistant Examiner

U.S. Cl. X.R.

8—1 XA, 162 R, 179